United States Patent [19]

Inoue

[11] Patent Number: 4,779,108

[45] Date of Patent: Oct. 18, 1988

[54] OPTICAL PRINTER HEAD

[75] Inventor: Toshio Inoue, Tottori, Japan

[73] Assignees: Sanyo Electric Co., Ltd.; Tottori Sanyo Electric Co., Ltd., both of Japan

[21] Appl. No.: 122,058

[22] Filed: Nov. 18, 1987

[30] Foreign Application Priority Data

| | | | |
|---|---|---|---|
| Nov. 18, 1986 | [JP] | Japan | 61-274659 |
| Nov. 19, 1986 | [JP] | Japan | 61-275878 |
| May 6, 1987 | [JP] | Japan | 62-67502[U] |
| May 20, 1987 | [JP] | Japan | 62-75909[U] |
| May 20, 1987 | [JP] | Japan | 62-75910[U] |

[51] Int. Cl.[4] ..... G02D 15/00

[52] U.S. Cl. ..... 346/160; 346/155

[58] Field of Search ..... 346/160, 155, 107 R, 346/108; 400/119; 101/DIG. 13; 358/302; 357/17

[56] References Cited

U.S. PATENT DOCUMENTS

| | | | |
|---|---|---|---|
| 4,524,372 | 6/1985 | Pe Cock et al. | 346/160 |
| 4,536,778 | 8/1985 | De Schamphelaere et al. | 346/160 |

FOREIGN PATENT DOCUMENTS

| | | | |
|---|---|---|---|
| 60-86853 | 5/1985 | Japan | 346/160 |
| 65645039 | 4/1986 | Japan | 346/160 |
| 61-1145877 | 7/1986 | Japan | 346/160 |
| 61-1147584 | 7/1986 | Japan | 346/160 |

*Primary Examiner*—Arthur G. Evans

*Attorney, Agent, or Firm*—Darby & Darby

[57] ABSTRACT

An optical printer head, wherein a plurality of LED arrays consisting of Ga are arranged in serial in the aligned direction of LEDs, and are fixed on the base plate, fine conductors for connecting the respective LED arrays with respective drivers being supported by insulating sheets.

20 Claims, 6 Drawing Sheets

OPTICAL PRINTER HEAD

BACKGROUND OF THE INVENTION

1. Field of the Invention

The present invention relates to an optical printer head using a plurality of LED (light-emitting diode) arrays.

2. Description of the Prior Art

Recently, a variety of optical printer heads using LED are widely made available for industrial uses. Of these, in particular, the one so-called one-line type optical printer head using a plurality of linearly-aligned LEDs along the total length of the main scanning line such as the one proposed by the U.S. Pat. No. 4,605,944 shares the majority. The optical printer head cited above comprises a plurality of linearly-aligned LED arrays being wired thereto and having emitter elements being aligned on the surface. The optical printer head having the above constitution is particularly useful for satisfying the needs for finer resolution for example, a resolution of more than 8 dots/mm is obtained. Since a number of emitter elements are arranged in a specific density equal to the print resolution, and yet, since these emitter elements are turned on in response to the print data, they generate substantial amount of heat. To improve the radiation efficiency, as cited in the U.S. Pat. No. 4,524,372, an art has been proposed for directly fixing LEDs onto a metal base plate made from aluminum for example. However, the proposed art still has some problems to solve. Concretely, thermally elongaged base plate may cause the LED array to eventually be disengaged from it or the expanded intervals of the juncture of adjoining LED arrays may cause the printing density to become loose. Furthermore, densely-distributed metallic leads connected to LED arrays may distort themselves to eventually cause either disconnection or poor contact to take place.

Any conventional optical printer head is provided with a typical constitution in which light is transmitted from the LED array to the printing object by applying either optical fibers or prism. Since it is not always necessary for the conventional optical printer head to densely arrange the LED arrays in the direction of aligned emitter elements wiring means made of insulated sheet with fine metal leads supported thereon has been conventionally made available for wiring the LED arrays. Due to relatively easy handling characteristic of this means material mentioned above, it may desirably be applied to one-line type optical printer head, i.e., to the one which densely arranges a plurality of LED arrays in the direction of the aligned emitter elements. However, this cannot be implemented due to the presence of some critical problems described below.

Although any conventional one-line type optical printer head has a number of emitter elements and electrodes which are individually attached to each of these emitter elements it is extremely difficult for this optical printer head to provide a metal lump on each of these densely-disposed electrodes. In particular, any lump having a substantial height cannot be formed in those narrow regions on the compound semiconductor of an LED array. Even if such a tall lump were provided in a relatively wide region, short circuit will easily happens between adjoining lump. To compensate for this, there is an idea for providing metal lumps which are to be formed on the fine leads of the wiring means. However, since these metal leads are too fine, and yet, since the metal lump should be set to both ends of metal leads by applying a microscope, when setting a metal lump to the other end after setting it to an end of the metal lead and also when pressing an end of the metal lead against the LED array for connection, heat generated by the pressure transmits itself through the fine metal leads, thus often causing the metal lump at the other end of the lead to fall down itself from the fine metal leads.

Furthermore, if the metal lump is installed onto a individual electrode like the one made of aluminum for example without support on a compound semi-conductor, the metal lump is easily flow or roll itself from the electrode due to thermal effect, or even if the metal lump is insufficiently connected to the individual electrode, the metal lump is easily be stripped off from the electrode due to the presence of 2 through 10mA of current flowing through the emitter elements. As a result, any conventional optical printer head cannot be effectively distribute fine metal leads with satisfactory productivity.

Likewise, since it is necessary to provide the LEDs with specific intervals at junctures being equal to those intervals of other portions, fine metal leads should be distributed in positions very close to each other without allowing both the cutting and connection work to be done smoothly. In particular, fine metal leads at edge portions easily become useless. For example, only a maximum of 125 micrometers (corresponding to 8 pieces per millimeter) of the interval can be generated even if wires are alternately extracted to both sides of the emitter elements arranged by 16 dots per millimeter. Likewise, even if these wires are drawn to specific positions closest to the center of the LED array, only about 500 micrometers of intervals can be provided at the junctures. On the other hand, since each fine metal lead has 50 micrometer of width for example, when cutting the insulated sheet into blocks at each LED array, these leads are easily damaged or stripped off from the insulated sheet, and thus the above method is not desirable for use.

In the light of rate of the non-defective and the characteristic of the operation, manufacturers cannot use such an LED array and leads having length corresponding to the scanning length, i.e., the full length of the printing line. When a plurality of LED arrays or leads are employed, adequate measures should be applied to the juncture portions. It is necessary for the juncture portions to be provided specific intervals between emitter elements being equal to those intervals between other portions, and in addition, fine metal leads corresponding to emitter elements should also be provided. The insulated sheet supporting fine metal leads projects itself from the row of metal leads, and in addition, wiring means may overlap themselves at the juncture portion to result in the formation of cubical shape. This easily allows stress to be applied to the wire-connected portion, thus eventually resulting in the poor connection or the inability to properly repair the faulty portion.

Generally, any conventional LED array is disposed in the lengthwise direction, while these LEDs are provided with the LED drivers which are aligned in the lengthwise direction. Thus, when aligning the LED arrays after connecting them to the drivers through fine metal leads, the leads connected to the drivers may obstruct the alignment work, or these wires may improperly be connected to each other. Conversely, when the alignment of the LED array precedes, the wiring means handling work become extremely complex. Consequently, wither of these conventional procedures has eventually resulted in inconvent processing work and low rate of the non-defective.

SUMMARY OF THE INVENTION

This invention has been invented in order to solve several aforementioned problems.

A first object thereof is to provide an optical printer head with improved printing quality, wherein a Ni-Fe alloy is used as the base plate material to retain thermal expansion of the plate in a range compatible with that of LED arrays and consequently prevent occurrence of any wire disconnection or imperfect contact due to deformation of wiring to LED arrays, resulting in improved reliability, while the space between emitting elements of neighboring LED arrays are made equal to those between emitting elements within LED arrays, so as to avoid local variation of the printing density.

A second object of this invention is to provide an optical printer head applying wiring means with conductors supported by insulating sheet, wherein the length of conductors connecting the LED array with the driver thereof is decided shorter than the length of LED array positioned perpendicular to the length direction of the aforesaid conductor.

A third object of this invention is to provide an optical printer head without any peel-off of the wiring means, wherein the surface of braided copper lead is plated with tin, while gold is used as a connection lump thereof.

A forth object of this invention is to provide an optical printer head without any peel-off of the conductor, wherein the insulating sheet of the aforesaid wiring means has a particular configuration.

A fifth object of this invention is to provide an optical printer head without any imperfect contact and connection, wherein the pitch between the conductors of the wiring means is decided according to a particular condition.

The above and further objects and features of the invention will more fully be apparent from the following detailed description with accompanying drawings.

DESCRIPTION OF THE PREFERRED EMBODIMENTS

Figure 1:
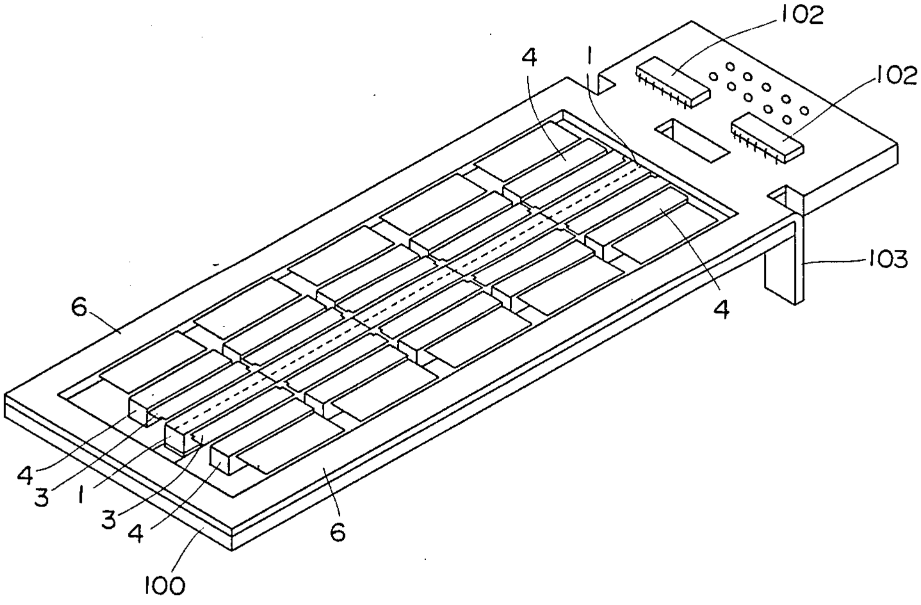
FIG. 1 is a perspective view of an optical printer head according to this invention.
Figure 2:
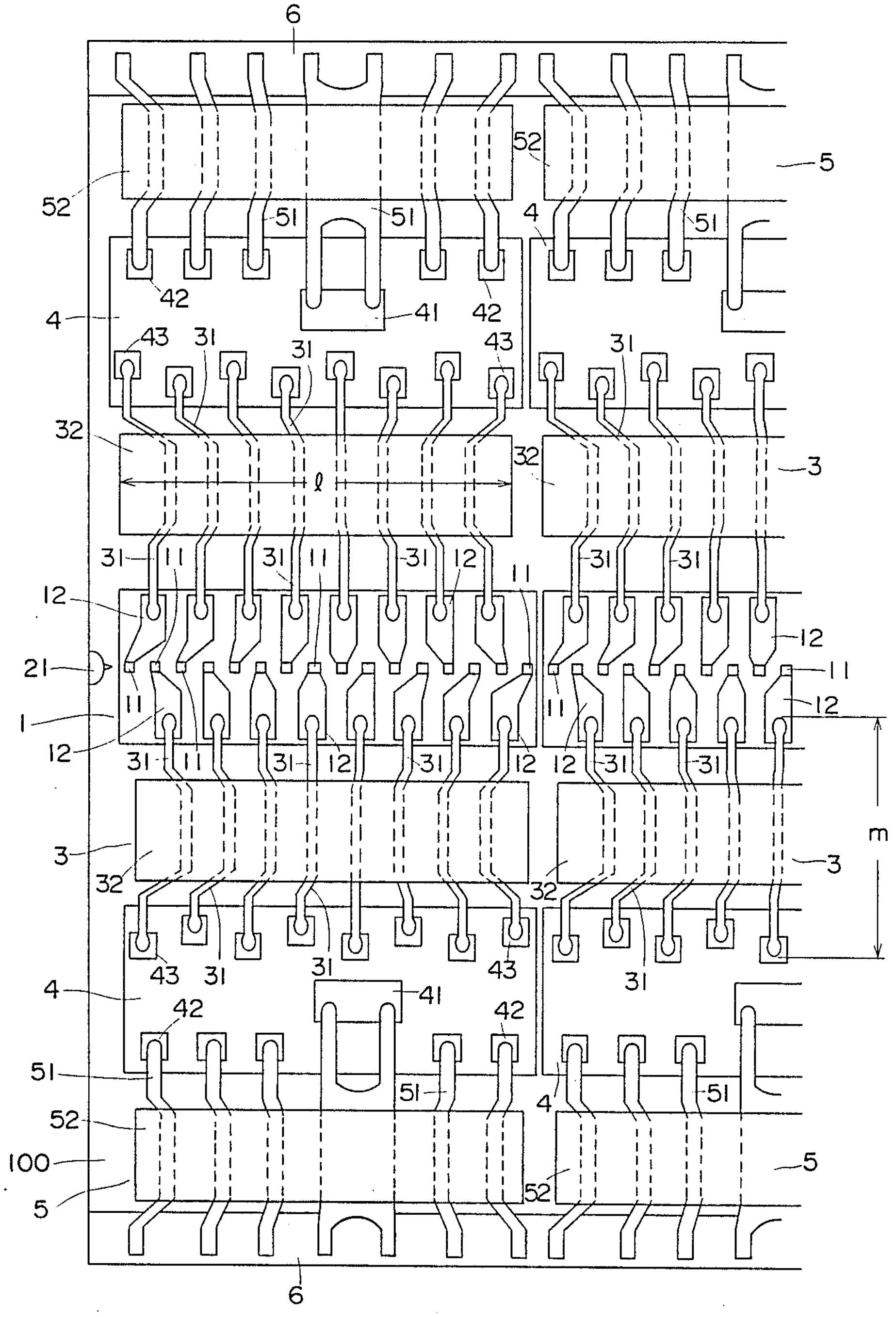
FIG. 2 is a partial layout plane view thereof.
Figure 3:
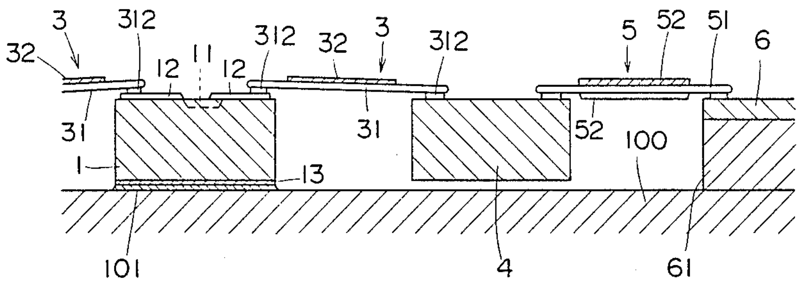
FIG. 3 is a partial cross-sectional view thereof.

FIG. 1 gives a perspective view of an optical printer head according to this invention and FIG. 2 gives a partial layout plane view, while FIG. 3 gives a partial cross-sectional view thereof.

A base plate 100 consisting of a 42Ni-Fe alloy has the thickness of 0.6–5.0 mm, the width of 25–30 mm and the length of 250–400 mm depending upon the number of LED arrays to be arranged in serial.

LED arrays 1 . . . being consisting of GaAsP/GaAs and others, emitter elements prepared by a selective diffusion method are provided in 11 . . . 11 rows on the surface thereof. The LED arrays 1,1 . . . with the lenght of 4–10.0 mm make the aligning directions of the emitter elements 11, 11 . . . coincide, while the positions thereof are fixed in a row on the middle zone of the width direction of the base plate 100 in such manner that the pitch of emitter elements 11, 11 of neighboring LED arrays becomes equal to the pitch of emitter elements 11,11 of the same LED array. The LED array 11 has a common electrode 13 provided in the back side of the LED array, being fixed on the surface of the base plate, by using an electroconductive adhesive 101. The LED array 1 is provided with individual electrodes 12,12 . . . obtained by an evaporation method and others for supplying electric power to respective emitter elements 11,11, each half of the electrodes being located on both sides of the line of emitter elements 11,11 . . . .

The both sides of respective LED array 1 are provided with drivers 4,4; an integrated circuit of shift register, latch register, transistor arrays etc., which drive the emitter elements 11,11 . . . connected with individual electrodes, 12,12 . . . on the same side. The drivers 4,4 . . . are arranged in 2 lines in parallel with the line of the LED arrays 1,1 . . . . The driver 4 is provided with a power supply pad 41, input pads 42,42 . . . and output pads 43,43 . . . . The output pads 43,43 . . . are connected with individual electrodes faced to each other by fine metal leads 31,31 . . . . The fine metal leads 31,31 . . . are supported on a rectangular insulating sheet 32 with, for example, the thickness of 125 μm made of polyimide, such wiring means 3 being called as a film carrier in general.

As the aforesaid fine metal leads, with the width of 50 μm and the thickness of 35 μm, for an example, a tin-plated copper lead is used in order to assure high adhesion strength. There are gold connection lump 312 under the both leading end portions, which are connected with the individual electrode 12 and the output pad 43 of the driver.

The fine metal leads 31 are supported on the back side of the insulating sheet 32 or between two insulating sheets. However, the insulating sheet 32 tends to be subjected to bending deformation due to thermal effects or time lapse change especially for the wiring means 3 supporting the fine metal leads 31, 31 . . . with high density. For example, even if a polyimide resin is used as a thin insulating sheet 32 of 125 μm, the insulating sheet 32 shows a visible bending deformation in case of an optical printer head used for printing 1000 paper sheets with the size A4 and the turn-on rate of 20% and imperfect conductivity takes place for the wiring means 3 with an overcoat. It is recommended, therefore, to support the metal leads 31, 31 . . . on any single side only of the insulating sheet 32.

As shown in FIG. 3, the circuit board 6, 6 is indirectly through a spacer or directly fixed to both ends in the width direction of the base plate 100. The circuit board 6, 6 . . . is used for connecting the power supply or transmitting driving signals or driving timing pulse from an exterior circuit, the electrode portions thereof being connected through the wiring means 5 with the power supply pads 41, 41 . . . and the input pads 42,42 . . . of the drivers 4, 4 . . . . The wiring means 5 support a fine metal lead 51 being the same as the fine metal lead 31, by holding the fine metal lead 51 from both sides thereof between insulating sheet 52,52 being the same as the insulating sheet 32. Moreover it is to be noted that either one of the insulating sheet 52 may be substituted with a coating membrane such as resist. The fine metal lead 51 is provided with a gold connection lump at the leading end thereof in the driver side, while the circuit board 6 side thereof is provided with a soldered terminal moreover, the fine metal lead 51 to be connected with the power supply pad 41 has a sufficient cross-sectional area. As clearly understood from FIG. 3, the driver 4 is supported with 2 wiring means 3, 5 in a condition of floating on the base plate 100. If the driver 4 is fixed directly on the base plate, a tensile force may act on the wiring means 3 of high density (4–15 lines/mm) during connection works thereof, resulting in a connection failure. A thermal expansion when printer head is driven, cause similar tensile force on the wiring means 3, resulting in a connection failure or disconnection. The floating positioning of the driver 4 apart from the base plate is effective to avoid such tensile force and consequent connection failure. When heat transfer from the base plate 100 to the driver 4 is called to account from design viewpoints of high-temperature stability, certain air gap may be provided under the driver 4. When heat radiation of the driver 4 should be directed to the base plate 100, it is recommended to use a thermal-conductive insulation grease such as silicone grease (for example, G 746 with thermal conductivity $11\times10^{-3}$ cal/cm/sec °C. Shinetsu Chemical Industry Inc.) between the driver 4 and the base plate 100. In the latter case the intervention of the silicone grease contributes to heat radiation and absorption of mechanical vibration from outside. It is needless to note that the driver 4 should remain movable in the presence of any insulation grease.

Though the wiring means 5, 5 are lower in the density than the wiring means 3, 3, the connecting position thereof with the drivers 4, 4 requires a positioning precision, nearly comparable with that for the wiring means 3, 3. The temperature of the base plate 100 becomes highest during fixing work of the wiring means 5, 5 themselves, therefore, it is recommended to use thin circuit board 6, 6 such as a flexible polyimide or epoxy resin base plate, so as to avoid any dislocation in the aforesaid critical condition.

Figure 4:
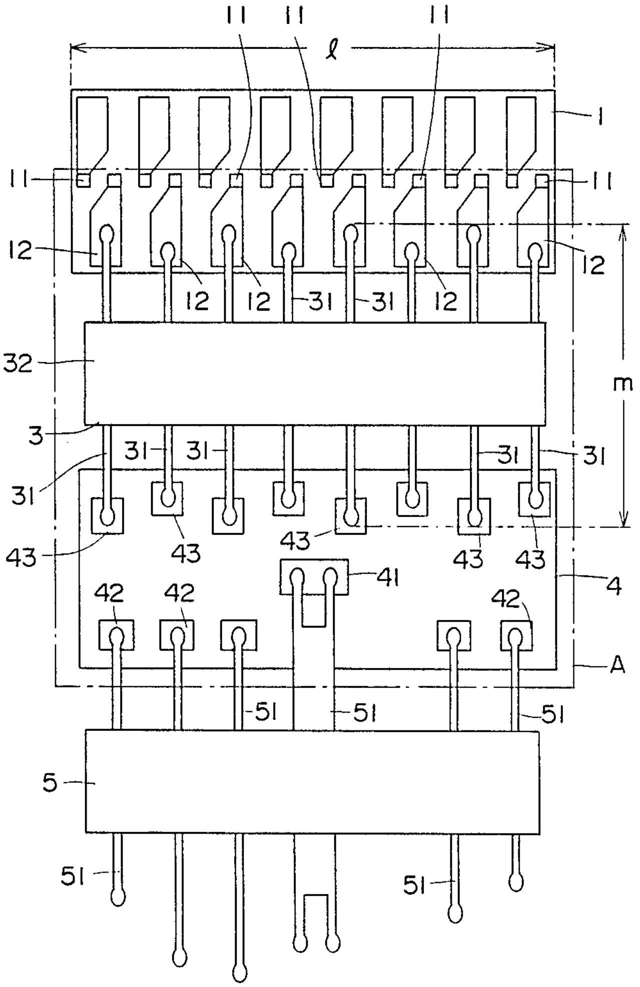
FIG. 4 is a partial layout plane view of another embodiment.

It is to be noted in this embodiment that the length, (m) of the fine metal lead 31 is shorter than the length, (l) of the LED array 1. The length (l) depends upon the rate of the non-defective and uniformity of emitter elements. The length of 4.0–10 mm is normally adopted. Since main scanning length of the optical printer is 200–400 mm too short length causes aligning waviness, i.e., the total length of the LED arrays 1, 1 . . . . If a plurality of the wiring means 3 are used for only one LED array 1 or only one wiring means 3 is used for wiring a plurality of the LED arrays 1, pitch mismatching at joint a plurality portions, connection failures, peel off during driving conditions may take place, therefor, the length of the wiring means 3 (any longer one among the length of the insulating sheet 32 and the alignment length of the fine metal leads 31, 31 . . . ) should be equal to or slightly shorter than the length (l) of the LED array 1. On the other hand, the diameter of metal lumps 312, 312 . . . to metal wirings 31, 31 . . . is 65–85μ, depending upon the anchoring reliability required. When the individual electrodes 12, 12 . . . are arranged at high density, therefor, there are some cases wherein the metal lumps 312, 312 . . . should be shifted slightly and alternately to each other in the width direction of the connection position, the LED array 1 or the driver 4. In an example, as shown in FIG. 4, the positions of the output pads 43 in the side of the driver 4 are staggered. FIG. 4 shows also a staggered positioning on the individual electrodes 12 of the LED array 1. When the anchor portions of the wiring means 3 are connected at the same time under thermal compression and the LED array 1 is in the visual range A of a microscope as shown in FIG. 4, it is needed that all anchor portions are found in the aforesaid visual range.

By using a press iron with a square pressing area of side length comparable with the row of the connection portions, uniform thermal distribution is assured at leading end of the iron, therefore, it is needed that the wiring means 3, preferably connection portions for drivers of the wiring means 5, and the wiring means 3 is found in a square area of the LED array length. Accordingly at least the length (m) of the fine metal leads 31, 31 . . . should be shorter than the length (l) of the LED array 1.

The metal lump 312 is attached to the leading end of the fine metal leads 31, 31, by using a transfer printing method and connected with the individual electrode 12, the output pad 43 and others. Our experience has evidenced that when the fine metal leads 31 are positioned at high density, such as the density over 4 lines/mm and a practical interval (space)/positioning pitch (s/p) ratio of the fine metal leads 31 is 30–70%, any anchoring failure due to heat irregularity does not occurs. While anchor failures are found at lower density; for example, anchor failures of 3–4 lines per 1000 lines are found in a case 3 lines/mm, s/p=50%.

In FIG. 1, the reference numeral 102 represents a signal buffer and the reference numeral 103 represents an electric power bus, while the rotation 21 in FIG. 2 is a center marker attached to the base plate, which indicates the positions of the emitter elements 11, 11 . . . of the LED arrays 1, 1 . . . .

In the optical printer head as described above according to this invention, the thermal expansion coefficient; $4-7\times10^{-6}$/°C. of the 42Ni-Fe alloy for the base plate is nearly equal to that; $6.86\times10^{-6}$/°C. of GaAs or the like Ga compound such as GaP, GaAsP, for the LED arrays, because if the LED array and the base plate are adhered together at the operating temperature (60°–100° C.) of the LED arrays for assuring mutual heat transfer, there is no tension or compression force acting between the LED arrays and the base plate and no stress formation in the adhesive layer. Breakdown or contact failures of the fine metal leads also doesn't take place because of no force acting thereon. Moreover, the pitch variation between the neighboring LED arrays due to thermal expansion is nearly equal to the variation within the LED arrays, therefore, the pitch of the emitter elements change uniformly, resulting in no degradation of printing quality, the high printing quality can be maintained. There is no contact failure due to thermal effects or no short-circuit trouble, because the wiring with high density is carried out without any fixing on the base plate and furthermore the fine metal leads are supported on the insulating sheet. The dimensions (m,l) being determined as described above, the wiring means 3 can be in the visual range of a microscope, allowing simultaneous thermal compression of the metal lumps 312 and reliable wiring works under uniform thermal effects. Consequently printer heads with resolution power of 8–25 dots/mm for paper size of A4-A2 can be presented with high productivity.

Furthermore, the gold bump is kept by the fine metal leads just until thermal compression thereof and no flow onto surfaces of individual electrodes made of aluminum even if contacted together and the major portion of the connection lumps can be utilized directly for anchoring.

With application of the fine metal leads made of tin-plated copper, earlier release of the bump from the fine metal leads can be prevented. Solders made of, for example, indium or tin-lead tend to be flowed along surfaces of the fine metal leads and make a thin film at the fixing portion, resulting in insufficient adhesive strength. Earlier release of bump will take place when fine metal leads other than copper leads are used. Such troubles are not found in the fine metal leads according to this invention. Any material other than aluminum film is not recommended for the individual electrodes, because of stress formation on compound semiconductors during electrode-patterning.

Figure 5:
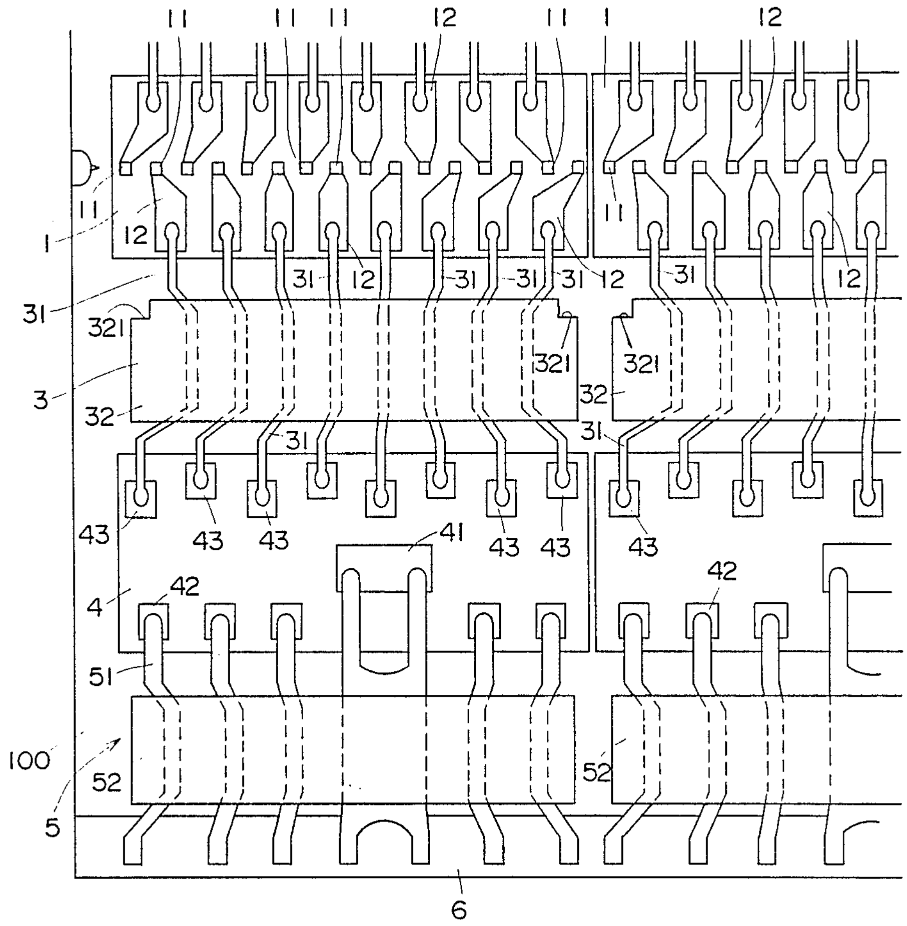
FIG. 5 is a layout overview of further another embodiment.

For this embodiment, the aging of 500 hours with 40 mA pulse current produced no connection failure of the wiring means, evidencing solid and stable wiring results. FIG. 5 is a layout plane view of another embodiment, prevents any peel off of the fine metal leads from the insulating sheet, due to a force acting from the insulating sheet onto the fine metal leads during manufacturing of the insulating sheet, wherein notches 321, 321 . . . are at corner zone in the side of the LED arrays 1 of the insulating sheet 32 for the wiring means 3.

The above embodiment will be described in detail. When the resolution power of the optical printer is 16 pieces/mm, the emitters 11, 11 . . . are also aligned at the density of 16 pieces/mm. When the individual electrodes 12, 12 . . . are arranged on both sides of the row of the emitters 11, 11 . . . , standard pitch of the individual electrodes 12, 12 . . . becomes 125 μm. Though for simplification shorter LED arrays are illustrated, the length thereof is in the range of 4–8 mm, normally depending upon uniformity of characteristics thereof or the yield thereof. With the length of 6 mm, for example 96 elements 11 are found in one LED array 1, 1, while 48 individual electrodes 12, 12 are arranged on one side thereof. These individual electrodes 12, 12 are shifted to the center zone with the pitch of 110 μm narrower by 15 μm, as compared with the standard pitch of 125 μm. The middle zone of the fine metal leads 31, 31 . . . concentrated to the pitch of 100 μm, while the LED array side and the driver side are adjusted to the pitch of 110 μm and 118 μm respectively. With the construction as described above, the end portion of the LED array has the joint allowance of 360 μm={6000-(110×48)}/2 between the end connection portion and end periphery of the LED array, while the insulating sheet is cut off in a point apart by 250 μm from the fine metal leads of the end portion and notches 321, 321 of 200×100 μm size are provided at corner of the cut-off point. As described later, the fine metal leads are fixed to the insulating sheet belt made of long polyimide film and then an notch with the side length of 200 μm is arranged in a zone to be caught off. A cut off nearly at the center zone of the notch forms notches 321, 321 described above.

Figure 6:
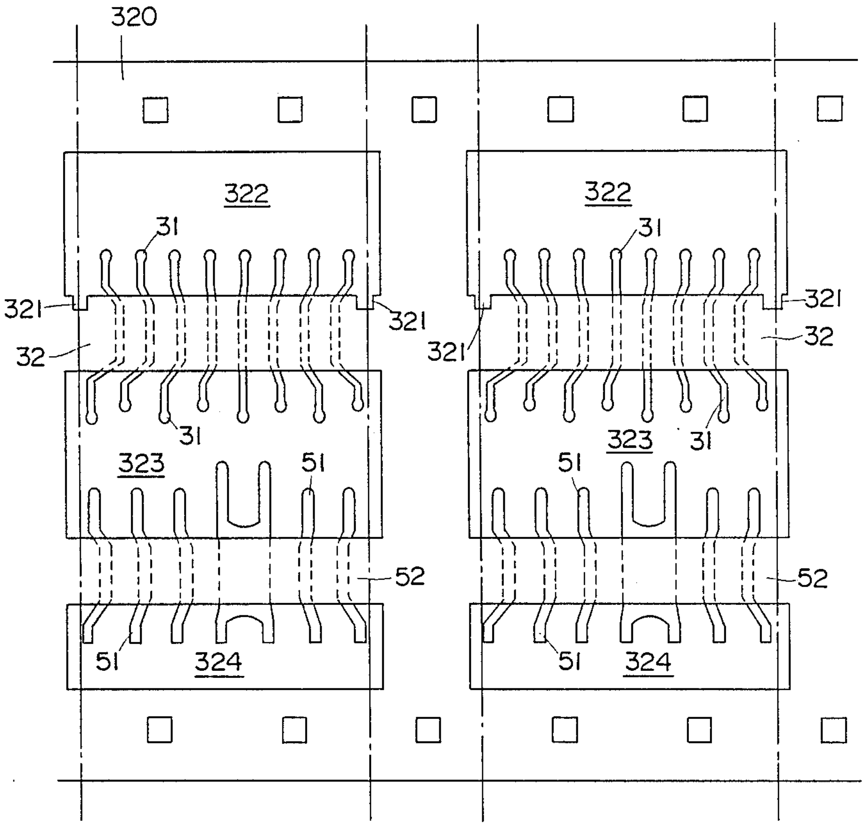
FIG. 6 is a layout overview of wiring means during manufacturing thereof.

FIG. 6 gives a pattern overview of the wiring means 3, 5 driving manufacturing stage thereof, wherein rectangular holes 322, 323, 324 are provided in the width direction of the band-like insulating sheet 320 with sprocket holes in both ends. It is intended to utilize the band-like portion between these holes as the insulating sheet 32, 52 the fine metal leads 31, 51 being fixed to this portion. The portion near at both ends of the portion to be the LED array side of the insulating sheet is provided with a notch 321 in connection with the hole 322. Such insulating sheet 320 is cut off after a fixing process thereof on the front surface of the insulating sheet 52 side and a forming process of the bump at leading ends of the fine metal leads 31, 51. The cut off position as shown in a broken line passes through the notches 321, 321, which serve therefore as the marker of the cut-off position during manufacturing stage of the wiring means 3, 5.

During shear cut of the insulating sheet 320, the portion thereof near to the cutting blade is trapped into the moving direction of the cutting blade or repelled due to reaction against the cutting action.

In a portion provided with notches 321, 321, such force acts on a portion of the notch 321 in face with the hole 322, therefore, the connection part of the fine metal lead near to the portion described above is unavoidably subject to influence of such force but no force due to the aforementioned trapping or repelling action on the hole 322 periphery portion (most effective for cutting and peeling off the fine metal lead) of the aforesaid fine metal lead 31, resulting in a reduced rejection rate.

These notches may be useful when provided to other holes 323, 324, however, most useful for the hole 322, because the fine metal leads in the LED array side are arranged especially at high density, as described before.

Figure 7:
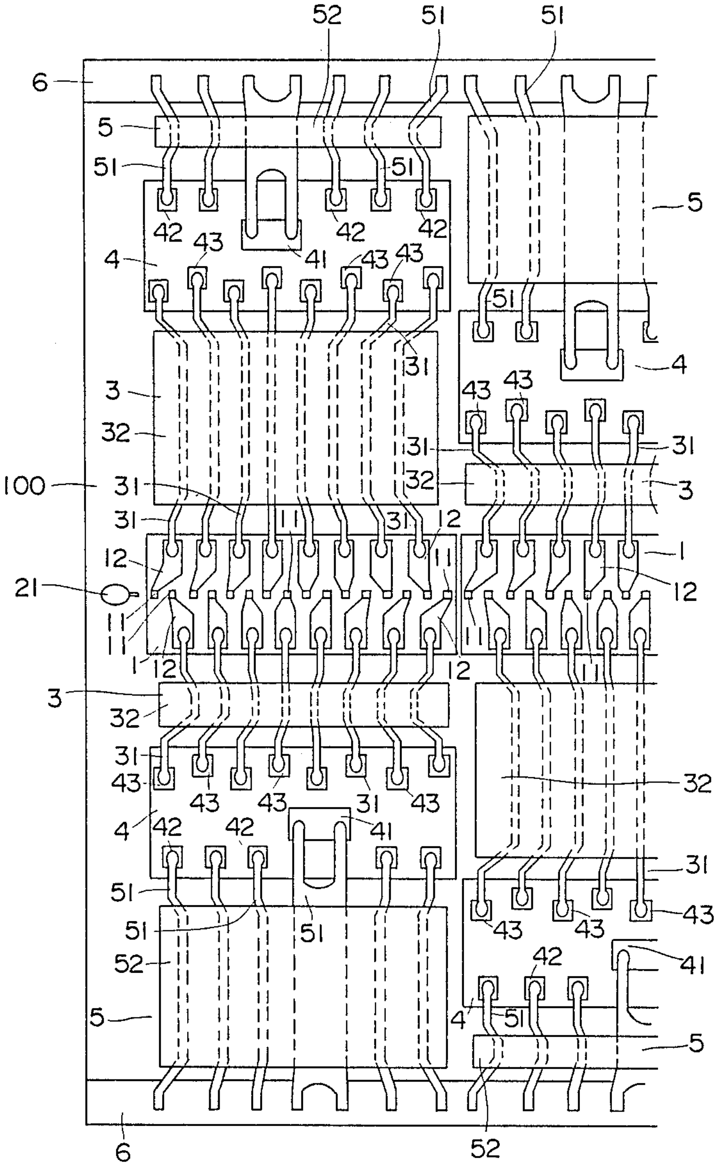
FIG. 7 is a layout plane view of a further another embodiment.

Another embodiment shown in FIG. 7 is featured with a staggered arrangement, wherein the position of the drivers 4 is staggered in the width direction of the base plate 100, two different positions; one position near to the LED array 1 and another position far from the LED array 1 being selected. The wiring means 3 and 5 varies at each neighboring array 1, 1.

The most important matter in this embodiment is the requirements for the pitch of the fine metal leads 31 and 51; i.e., the pitch of the metal leads 31 in the LED array 1 side $g1 \leqq$ the pitch of the metal leads 31 in the driver 4 side $g2 \leqq$ the pitch of the metal leads 51 in the driver 4 side $g3 \leqq$ the pitch of the metal leads in the base plate side $g4$ Hereafter concrete description will be given. It is supposed that the resolution power of the optical printer is 16 dots/mm and the emitter elements 11, 11 . . . are arranged at the density of 16 pieces/mm, i.e. the pitch of 62.5 μm. If the individual electrodes 12, 12 . . . are allocated alternatively as shown, on both sides of the row of the emitter elements 11, 11 . . . , the arrangement pitch of the individual electrodes 12, 12 . . . on one side becomes 125 μm, but the pitch is adjusted to 110 μm by the centering thereof. On the other hand, the output pads 43, 43 of the drivers 4, 4 . . . takes a staggered arrangement with the pitch of 118 μm for the purpose of easy wiring connection, the input pads 42, 42 . . . and the power supply pad 41 have a fundamental arrangement pitch of 225 μm, so that if there is no need of any pad, the terminal pitch is multiplied by integers. The fundamental arrangement pitch for exposed pattern of wiring connections on the wiring circuit boards 6, 6 is 500 μm similarly, though the arrangement pitch of the connection portion of the fine metal leads 31, 31 . . . 51,

51 . . . for the wiring means 3, 3 . . . 5, 5 . . . is matched with the pitch as described above of the terminals and others, the support portions thereof with the insulating sheet 32, 52 consisting of polyimide film and others is squeezed to the fundamental pitches of 100 μm and 200 μm respectively. Before assembling the insulating sheet 32, 52 is integrated as a belt-like sheet with a configuration as shown in FIG. 6, having transmitting holes for one LED array and one driver element.

In the assembling process the individual electrodes 12, 12 . . . on single side of one LED array 1 and all terminals 41, 42, 42, 43, 43 . . . on one driver element 4 are anchored simultaneously to wirings and then the insulating sheet is cut off near to the squeezed portion of the fine metal leads, then fixing to wirings on another side are executed in order to make blocks of two driven element 4 of LED arrays 1, 2. A plurality of such blocks are assembled, while electroconductive adhesive is printed and coated in a band form on the base plate 100 for fixing LED arrays successively block by block and mounting and fixing of the LED array 1. The position matching or mounting work is simplified, because there is no fine metal lead at least one end of the LED array 1. The driver elements 4, 4 are supported not by the base plate 100 but by the wiring means 3, 5 only, however, the wiring pitch widened towards the leading end assures sufficient holding power thereto, though many fine metal leads 31, 31 . . . are used, the pitch (110 μm–100 μm) is narrower than the standard pitch (125 μm), therefor, the insulating sheet 62 can be cut off with the length equal to or shorter than that of the LED array. Any overlap of neighboring means can be avoided but a difficulty may take place for arranging the driver elements 4, 4. In such cases, a staggered arrangement as shown in FIG. 7 of the driver elements is recommended, changing the length of the wiring means 3, 3 . . . .

After mounting the LED arrays 1, 1 are fixed under heating, while the circuit boards 6, 6 and the wiring means 5, 5 are connected together. The wiring pitch of 500 μm being the widest, a thermal compression is carried out sufficiently, assuring a stress-free condition to the driver elements 4, 4 and the wiring portions thereof.

Generally speaking any thermal effect during processings described above or practical applications tends to deform the insulating sheet and such deformation may cause connection failures due to mechanical force especially for wirings with high density such as the LED array side, the fine metal leads 31, 31 . . . with high density over 5 lines/mm according to this invention are supported on single side thereof, preventing such connection failures. Any presence of power feed path in the fine metal leads may cause exoergic or produce a heat conductivity propagation route, resulting in peel-off of this insulating sheet, however, there is no trouble for the fine metal leads 51, 51 . . . supported on the both sides thereof, according to this invention.

With the embodiment as described in FIG. 7, simultaneous wirings van be realized for presenting the line printer type printer heads with the emitter elements aligned in the main scanning length. For the aligning works the emitter elements at joints can be found easily while respective components are supported stably and arranged in a plane form, assuring good workability.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An optical printer head comprising:
- a plurality of LED arrays, consisting of Ga compound, which have a plurality of aligned emitter elements respectively, and are fixed on the base plate in the aligned direction of the emitter elements;
- a plurality of drivers used for driving respective LED arrays; and
- a plurality of conductors for connecting the respective LED arrays with the respective drivers,
- wherein said base plate consists of Ni-Fe alloy and said conductors are supported by insulating sheets.

2. An optical printer head as set forth in claim 1, wherein said base plate consists of 42Ni-Fe alloy.

3. An optical printer head as set forth in claim 1, wherein said insulating sheets are separated by each said LED array.

4. An optical printer head as set forth in claim 1, wherein said conductors are supported by the insulating sheet at the density over 4 lines/mm.

5. An optical printer head as set forth in claim 1, wherein said conductors on single side thereof are supported by the insulating sheet.

6. An optical printer head as set forth in claim 1, wherein the length of said conductors is changed by each combination of respective LED arrays and drivers and a plurality of the drivers are arranged in a stagger manner.

7. An optical printer head as set forth in claim 3, wherein the length of said conductors is shorter than the length in the aligned direction of the emitter elements of the LED array.

8. An optical printer head as set forth in claim 3, wherein the length of said LED array in the aligned direction of said emitter elements of said LED array is longer than the length of said insulating sheet in the same direction.

9. An optical printer head as set forth in claim 1, wherein said insulating sheet is provided with notches at the corner part thereof in said LED array side.

10. An optical printer head comprising;
- a plurality of LED arrays, consisting of Ga compound, which have a plurality of aligned emitter elements respectively, and are fixed on the base plate in the aligned direction of the emitter elements;
- a plurality of drivers used for driving respective LED arrays;
- a plurality of first conductors for connecting the respective LED arrays with the respective drivers;
- a circuit board provided on said base plate and isolated electrically from the base plate; and
- a plurality of second conductors for connecting respective drivers with said circuit board,
- wherein said base plate is made of Ni-Fe alloy, and said conductors are supported by insulating sheets.

11. An optical printer head as set forth in claim 10, wherein said drivers are floating-positioned and supported by said first and second conductors.

12. An optical printer head as set forth in claim 11, wherein there is a buffer means provided between said drivers and said base plate.

13. An optical printer head as set forth in claim 10, wherein said base plate consists of 42Ni-Fe alloy.

14. An optical printer head as set forth in claim 10, wherein said insulating sheet are separated by each LED array.

15. An optical printer head as set forth in claim 10, wherein said first conductors are supported by the insulating sheet at the density over 4 lines/mm.

16. An optical printer head as set forth in claim 10, wherein the pitch of the first conductor in the LED array side ≦ the pitch of the first conductor in the driver side ≦ the pitch of the second conductor in the driver side ≦ the pitch of the second conductor in the wiring base side.

17. An optical printer head as set forth in claim 10, wherein said first conductors on single side thereof are supported by the insulating sheet.

18. An optical printer head as set forth in claim 10, wherein the length of said first conductors is changed by each combination of respective LED arrays and drivers, and a plurality of the drivers are arranged in a stagger manner.

19. An optical printer head as set forth in claim 14, wherein the length of said LED array in the aligned direction of the emitter elements of said LED array is longer than the length of said insulating sheet in the same direction.

20. An optical printer head as set forth in claim 10, wherein said insulating sheet is provided with notches at the corner part thereof in said LED array side.

* * * * *